United States Patent
Nakamura et al.

(10) Patent No.: US 7,478,887 B2
(45) Date of Patent: Jan. 20, 2009

(54) BRAKE CONTROL DEVICE AND BRAKE CONTROL METHOD

(75) Inventors: Eiji Nakamura, Nishikamo-gun (JP); Yasuji Mizutani, Brussels (BE); Takayuki Yamamoto, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/961,437

(22) Filed: Dec. 20, 2007

(65) Prior Publication Data

US 2008/0150352 A1 Jun. 26, 2008

(30) Foreign Application Priority Data

Dec. 21, 2006 (JP) .............................. 2006-343841
Dec. 6, 2007 (JP) .............................. 2007-316435

(51) Int. Cl.
*B60T 8/48* (2006.01)
(52) U.S. Cl. .............................. 303/113.4; 303/122.11
(58) Field of Classification Search ... 303/113.1–113.5, 303/122, 155, 122.11
See application file for complete search history.

(56) References Cited

U.S. PATENT DOCUMENTS

| 6,199,963 | B1 * | 3/2001 | Shimizu ..................... 303/155 |
| 6,425,644 | B2 * | 7/2002 | Kawahata et al. ........... 303/122 |
| 6,441,573 | B1 * | 8/2002 | Zuber et al. ................. 318/375 |
| 6,941,216 | B2 * | 9/2005 | Isogai et al. .................. 701/96 |
| 6,957,870 | B2 * | 10/2005 | Kagawa et al. ........... 303/113.4 |

FOREIGN PATENT DOCUMENTS

| JP | 2005-35471 | 2/2005 |
| JP | 2006-123889 | 5/2006 |

* cited by examiner

*Primary Examiner*—Christopher P Schwartz
(74) *Attorney, Agent, or Firm*—Oblon, Spivak, McClelland, Maier & Neustadt, P.C.

(57) ABSTRACT

A brake control device includes a control unit that determines a driver's braking request to have occurred when a brake-on determination condition is satisfied and determines the driver's braking request to have been cancelled when a brake-off determination condition is satisfied.

22 Claims, 1 Drawing Sheet

FIG.1

BRAKE CONTROL DEVICE AND BRAKE CONTROL METHOD

INCORPORATION BY REFERENCE

The disclosures of Japanese Patent Application Nos. 2006-343841 filed on Dec. 21, 2006 and 2007-316435 filed on Dec. 6, 2007, including the specifications, drawings and abstracts are incorporated herein by reference in their entirety.

BACKGROUND OF THE INVENTION

1. Field of the Invention

The present invention relates to a brake control device and a brake control method, and, more particularly, to a brake control device and a brake control method that control the braking force applied to the wheels provided on a motor vehicle.

2. Background of the Invention

A brake-by-wire system is described in, e.g., Japanese Patent Application Publication Nos. JP-A-2005-35471 and JP-A-2006-123889. The brake-by-wire system generates braking force through electronic control by detecting a driver's brake operation.

With the brake-by-wire system, there is a need to detect a driver's brake operation. In order to reliably generate braking force in response to a driver's request, the brake system must have additional fail-safe mechanisms to ensure that the operation of the brake pedal by the driver is appropriately detected. The brake system must also ensure that no braking force is generated when the brake pedal is not operated.

SUMMARY OF THE INVENTION

The present invention provides a brake control device and a brake control method that reliably determine the driver's operation of the brake pedal.

In accordance with a first aspect of the present invention, there is provided a brake control device that includes a control unit that determines a driver's braking request to have occurred when a brake-on condition is satisfied and determines the driver's braking request to have been cancelled when a brake-off condition is satisfied.

In accordance with a second aspect of the present invention, there is provided a brake control device that includes a control unit that determines a driver's braking request to have occurred when a brake-on determination condition is satisfied and determines the driver's braking request to have been cancelled when a brake-off determination condition is satisfied. The brake-off determination condition differs from the opposite of the brake-on determination condition.

With such configurations, the brake-off determination condition is not merely set as the negative of the brake-on determination condition but is set differently than the negative of the brake-on determination condition. In this regard, the term "negative of a condition" means that, when a condition (A) is given, the negative of condition (A) is the opposite of condition (A). Therefore, an optimum determination condition may be set depending on the behaviors of a brake system at the brake-on and brake-off time, i.e., during the occurrence and cancellation of a braking request. In particular, the determination condition can be set in due consideration of the target measurement quantities in the brake-on state and the brake-off state, e.g., the difference in variations of the working hydraulic pressure. This makes it possible to reliably determine the occurrence or absence of a driver's request for braking.

The control unit may be designed to use the wheel cylinder pressure in respect of the brake-on determination condition but not to use the wheel cylinder pressure in respect of the brake-off determination condition. With this configuration, the control unit determines the brake-off state based on an input signal other than the wheel cylinder pressure. It is sometimes the case that, depending on the circumstances, the wheel cylinder pressure remains after the release of a driver's brake operation. Therefore, the brake-off determination may be reliably determined by without using the wheel cylinder pressure.

Further, the control unit may determine a brake-off state using an input signal that exhibits a higher responsiveness to the release of the brake pedal than wheel cylinder pressure. With this configuration, the control unit determines the brake-off state based on an input signal that exhibits a higher responsiveness to the release of the brake pedal than the wheel cylinder pressure, e.g., an input signal supplied from a stop lamp switch. Use of the input signal being changed immediately upon the release of the brake pedal in place of the wheel cylinder pressure makes it possible to rapidly and reliably determine the brake-off state.

The control unit may determine the brake-off state using an input signal supplied from a stop lamp switch. Use of the input signal supplied from the stop lamp switch makes it possible to rapidly determine the brake-off state.

In accordance with a third aspect of the present invention, there is provided a brake control method that includes: determining a driver's braking request to have occurred when a brake-on determination condition is satisfied and determining the driver's braking request to have been cancelled when a brake-off determination condition is satisfied.

In accordance with a forth aspect of the present invention, there is provided a brake control method that includes: determining a driver's braking request to have occurred when a brake-on determination condition is satisfied and determining the driver's braking request to have been cancelled when a brake-off determination condition is satisfied. The brake-off determination condition differs from the opposite of the brake-on determination condition.

In the first and the third aspects, the brake-off determination condition may Be a condition that is the opposite of the brake-on determination condition.

In accordance with the above aspects of the present invention, it becomes possible to reliably determine the occurrence or absence of a driver's brake operation.

BRIEF DESCRIPTION OF THE DRAWINGS

The features and advantages of the present invention will become apparent from the following description of example embodiments, given in conjunction with the accompanying drawings, in which.

DETAILED DESCRIPTION OF THE EMBODIMENTS

Hereinafter, an example embodiment for carrying out the invention will be described in detail with reference to the accompanying drawing.

Figure 1:
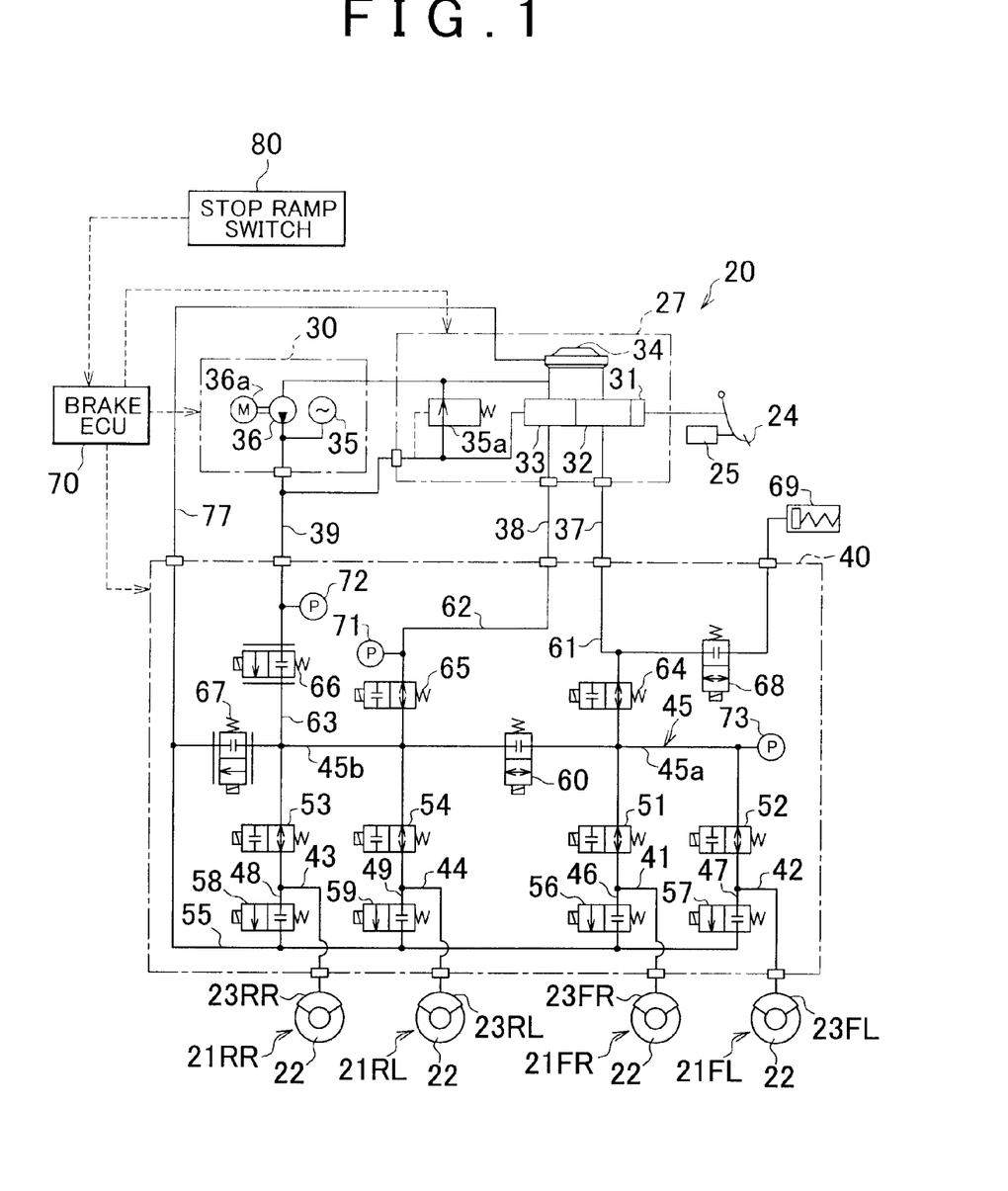
FIG. 1 is a system diagram showing a brake control device in accordance with an embodiment of the present invention.

FIG. 1 is a system diagram showing a brake control device 20 in accordance with an embodiment of the present invention. The brake control device 20 shown in this figure forms part of an electronically controlled brake system for a motor vehicle and controls the braking forces applied to four vehicle wheels provided on the motor vehicle. The brake control device 20 of the present embodiment is mounted on, e.g., a hybrid vehicle that includes an electric motor and an internal combustion engine as driving power sources. When braking such a hybrid vehicle, it is possible to use regenerative braking, which brakes the vehicle by converting the kinetic energy of the vehicle into electric energy, and hydraulic braking performed by the brake control device 20. In a motor vehicle equipped with the present invention, it is possible to execute the regenerative braking combination control by which desired braking forces are generated through regenerative braking and the hydraulic braking in combination.

As shown in FIG. 1, the brake control device 20 includes disc brake units 21FR, 21FL, 21RR and 21RL provided at each wheel, a master cylinder unit 27, a hydraulic power source 30, and a hydraulic actuator 40.

The disc brake units 21FR, 21FL, 21RR and 21RL are designed to apply braking forces to a right front wheel, a left front wheel, a right rear wheel and a left rear wheel of the vehicle, respectively. The master cylinder unit 27 of the present embodiment plays a role of a manual hydraulic pressure source and feeds pressurized brake fluid to the disc brake units 21FR, 21FL, 21RR and 21RL in proportion to the operation amount of a brake pedal 24. The hydraulic power source 30 feeds the brake fluid, as working fluid, pressurized by the supply of power, to the disc brake units 21FR, 21FL, 21RR and 21RL independently of the operation of the brake pedal 24. The hydraulic actuator 40 appropriately regulates the pressure of the brake fluid supplied from the hydraulic power source 30 or the master cylinder unit 27 and then feeds the brake fluid to the disc brake units 21FR, 21FL, 21RR and 21RL. This makes it possible to regulate the braking forces applied to each wheel by the hydraulic braking.

The disc brake units 21FR, 21FL, 21RR and 21RL, the master cylinder unit 27, the hydraulic power source 30 and the hydraulic actuator 40 will now be described in more detail. The disc brake units 21FR, 21FL, 21RR and 21RL include brake discs 22 and wheel cylinders 23FR, 23FL, 23RR and 23RL built in brake calipers. The wheel cylinders 23FR, 23FL, 23RR and 23RL are connected to the hydraulic actuator 40 through different fluid channels. In the following description, the wheel cylinders 23FR, 23FL, 23RR and 23RL will be generally referred to as "wheel cylinders 23".

As the brake fluid is supplied from the hydraulic actuator 40 to the wheel cylinders 23 in the disc brake units 21FR, 21FL, 21RR and 21RL, brake pads as friction members are pressed against the brake discs 22 that rotates together with the vehicle wheels. This allows braking forces to be applied to the respective vehicle wheels. Although the disc brake units 21FR, 21FL, 21RR and 21RL are utilized in the present embodiment, other braking force applying mechanisms provided with wheel cylinders 23, e.g., drum brakes, may be used in place thereof.

The master cylinder unit 27 is a hydraulically boosted master cylinder in the present embodiment and includes a hydraulic booster 31, a master cylinder 32, a regulator 33 and a reservoir 34. The hydraulic booster 31 connected to the brake pedal 24 can amplify a pedal depressing force exerted on the brake pedal 24 and then transmit the amplified pedal depressing force to the master cylinder 32. The pedal depressing force is amplified as the brake fluid is fed from the hydraulic power source 30 to the hydraulic booster 31 via the regulator 33. The master cylinder 32 generates a master cylinder pressure having a predetermined booster ratio with respect to the pedal depressing force.

The reservoir 34 for storing the brake fluid is arranged above the master cylinder 32 and the regulator 33. When the brake pedal 24 is released, the master cylinder 32 communicates with the reservoir 34. On the other hand, the regulator 33 communicates with both the reservoir 34 and an accumulator 35 of the hydraulic power source 30. Using the reservoir 34 as a low pressure source and the accumulator 35 as a high pressure source, the regulator 33 generates a hydraulic pressure, the magnitude of which is substantially the same as that of the master cylinder pressure. The hydraulic pressure generated by the regulator 33 will be referred to as a "regulator pressure" herein below. The master cylinder pressure and the regulator pressure need not to be exactly equal to each other. For example, the master cylinder unit 27 may possibly be designed to ensure that the regulator pressure is slightly higher than the master cylinder pressure.

The hydraulic power source 30 includes a pump 36 in addition to the accumulator 35. The accumulator 35 serves to convert the pressure energy of the brake fluid pressurized by the pump 36 to the pressure energy of a filler gas such as a nitrogen gas or the like, e.g., to a pressure of about 14 to 22 MPa, and then accumulates the converted pressure energy for later use. The pump 36 is provided with a motor 36a as a driving power source. The pump 36 has an inlet port connected to the reservoir 34 and an outlet port connected to the accumulator 35. The accumulator 35 is also connected to a relief valve 35a provided in the master cylinder unit 27. If the pressure of the brake fluid in the accumulator 35 grows very high and reaches, e.g., about 25 MPa, the relief valve 35a is opened to return the high pressure brake fluid to the reservoir 34.

As set forth above, the brake control device 20 includes the master cylinder 32, the regulator 33 and the accumulator 35, which serve as a source of the brake fluid to be supplied to the wheel cylinders 23. A master pipeline 37, a regulator pipeline 38 and an accumulator pipeline 39 are respectively connected to the master cylinder 32, the regulator 33 and the accumulator 35. The master pipeline 37, the regulator pipeline 38 and the accumulator pipeline 39 lead to the hydraulic actuator 40.

The hydraulic actuator 40 includes an actuator block having a plurality of flow paths formed therein and a plurality of electromagnetic control valves. The flow paths formed in the actuator block includes individual flow paths 41, 42, 43 and 44 and a main flow channel 45. The individual flow paths 41, 42, 43 and 44 are respectively diverged from the main flow channel 45 and connected to the wheel cylinders 23FR, 23FL, 23RR and 23RL of the corresponding disc brake units 21FR, 21FL, 21RR and 21RL. This allows the respective wheel cylinders 23 to communicate with the main flow channel 45.

In the middle of the individual flow paths 41, 42, 43 and 44, there are provided ABS keeping valves 51, 52, 53 and 54, each of which has an ON-OFF controlled solenoid and a spring. All the ABS keeping valves 51, 52, 53 and 54 are normally-opened electromagnetic control valves that remain open when the solenoid is deenergized. In the open state, the ABS keeping valves 51, 52, 53 and 54 allow the brake fluid to flow in two opposite directions. In other words, the brake fluid is allowed to flow from the main flow channel 45 to the wheel cylinders 23 and vice versa. If the ABS keeping valves 51, 52, 53 and 54 are closed by energization of the solenoid, the brake fluid is prevented from flowing through the individual flow paths 41, 42, 43 and 44.

The wheel cylinders 23 are also connected to a reservoir flow path 55 via pressure-reducing flow paths 46, 47, 48 and 49 respectively connected to the individual flow paths 41, 42, 43 and 44. In the middle of the pressure-reducing flow paths 46, 47, 48 and 49, there are provided ABS pressure-reducing valves 56, 57, 58 and 59, each of which has an ON-OFF controlled solenoid and a spring. All the ABS pressure-reducing valves 56, 57, 58 and 59 are normally-closed electromagnetic control valves that remain closed when the solenoid is deenergized. In the closed state, the ABS pressure-reducing valves 56, 57, 58 and 59 prevent the brake fluid from flowing through the pressure-reducing flow paths 46, 47, 48 and 49. If the ABS pressure-reducing valves 56, 57, 58 and 59 are opened by energization of the solenoid, the brake fluid is allowed to flow through the pressure-reducing flow paths 46, 47, 48 and 49. Therefore, the brake fluid is returned from the wheel cylinders 23 to the reservoir 34 via the pressure-reducing flow paths 46, 47, 48 and 49 and the reservoir flow path 55. The reservoir flow path 55 is connected to the reservoir 34 of the master cylinder unit 27 through a reservoir pipeline 77.

A divider valve 60 is provided in the middle of the main flow channel 45. The main flow channel 45 is divided by the divider valve 60 into a first flow path 45a connected to the individual flow paths 41 and 42 and a second flow path 45b connected to the individual flow paths 43 and 44. The first flow path 45a is connected to the wheel cylinders 23FR and 23FL for front wheels via the individual flow paths 41 and 42, while the second flow path 45b is connected to the wheel cylinders 23RR and 23RL for rear wheels via the individual flow paths 43 and 44.

The divider valve 60 has an ON-OFF controlled solenoid and a spring. The divider valve 60 is a normally-closed electromagnetic control valve that remains closed when the solenoid is deenergized. In the closed state, the divider valve 60 prevents the brake fluid from flowing through the main flow channel 45. If the divider valve 60 is opened by energization of the solenoid, the brake fluid is allowed to flow in two opposite directions between the first flow path 45a and the second flow path 45b.

A master flow path 61 and a regulator flow path 62 both communicating with the main flow channel 45 are also formed in the hydraulic actuator 40. More specifically, the master flow path 61 is connected to the first flow path 45a of the main flow channel 45 and the regulator flow path 62 is connected to the second flow path 45b of the main flow channel 45. The master flow path 61 is also connected to the master pipeline 37 that communicates with the master cylinder 32. The regulator flow path 62 is also connected to the regulator pipeline 38 that communicates with the regulator 33.

A master cut-off valve 64 is arranged in the middle of the master flow path 61. The master cut-off valve 64 is provided in a route through which the brake fluid is supplied from the master cylinder 32 to the wheel cylinders 23. The master cut-off valve 64 has an ON-OFF controlled solenoid and a spring. The master cut-off valve 64 is a normally-opened electromagnetic control valve that can be closed by an electromagnetic force generated by the solenoid upon supply of a specified control current but remains open when the solenoid is in a deenergized state. In the open state, the master cut-off valve 64 allows the brake fluid to flow in two opposite directions between the master cylinder 32 and the first flow path 45a of the main flow channel 45. If the master cut-off valve 64 is closed by supply of the specified control current to the solenoid, the brake fluid is prevented from flowing through the master flow path 61.

On an upstream side of the master cut-off valve 64, a stroke simulator 69 is connected to the master flow path 61 through a simulator cut-off valve 68. In other words, the simulator cut-off valve 68 is provided in a flow path that interconnects the master cylinder 32 and the stroke simulator 69. The simulator cut-off valve 68 has an ON-OFF controlled solenoid and a spring. The simulator cut-off valve 68 is a normally-closed electromagnetic control valve that can be opened by an electromagnetic force generated by the solenoid upon supply of a specified control current but remains closed when the solenoid is in a deenergized state. In the closed state, the simulator cut-off valve 68 prevents the brake fluid from flowing between the master flow path 61 and the stroke simulator 69. If the simulator cut-off valve 68 is opened by energization of the solenoid, the brake fluid is allowed to flow in two opposite directions between the master cylinder 32 and the stroke simulator 69.

The stroke simulator 69 includes a plurality of pistons and a plurality of springs. When the simulator cut-off valve 68 is opened, the stroke simulator 69 generates a reaction force in proportion to the depressing force of the brake pedal 24 applied by a driver. In order for the driver to have an improved brake operating feeling, it is preferred that the stroke simulator 69 employed exhibits multi-stage spring characteristics.

A regulator cut-off valve 65 is arranged in the middle of the regulator flow path 62. The regulator cut-off valve 65 is provided in a route through which the brake fluid is supplied from the regulator 33 to the respective wheel cylinders 23. The regulator cut-off valve 65 has an ON-OFF controlled solenoid and a spring. The regulator cut-off valve 65 is a normally-opened electromagnetic control valve that can be closed by an electromagnetic force generated by the solenoid upon supply of a specified control current but remains open when the solenoid is in a deenergized state. In the open state, the regulator cut-off valve 65 allows the brake fluid to flow in two opposite directions between the regulator 33 and the second flow path 45b of the main flow channel 45. If the regulator cut-off valve 65 is closed by energization of the solenoid, the brake fluid is prevented from flowing through the regulator flow path 62.

In addition to the master flow path 61 and the regulator flow path 62, an accumulator flow path 63 is formed in the hydraulic actuator 40. The accumulator flow path 63 is connected at one end to the second flow path 45b of the main flow channel 45 and at the other end to the accumulator pipeline 39 that communicates with the accumulator 35.

A pressure-increasing linear control valve 66 is arranged in the middle of the accumulator flow path 63. The accumulator flow path 63 and the second flow path 45b of the main flow channel 45 are connected to the reservoir flow path 55 via a pressure-reducing linear control valve 67. Each of the pressure-increasing linear control valve 66 and the pressure-reducing linear control valve 67 has a linear solenoid and a spring. All the linear control valves 66 and 67 are normally-closed electromagnetic control valves that remain closed when the solenoid is in a deenergized condition. The opening degree of the linear control valves 66 and 67 is controlled according to the intensity of an electric current applied to the solenoids.

The pressure-increasing linear control valve 66 is common to the respective wheel cylinders 23 provided corresponding to the vehicle wheels. Similarly, the pressure-reducing linear control valve 67 is common to the respective wheel cylinders 23. In other words, the pressure-increasing linear control valve 66 and the pressure-reducing linear control valve 67 employed in the present embodiment serve as a pair of common control valves that distribute the working fluid fed from the hydraulic power source 30 to the respective wheel cylinders 23. Use of the linear control valves 66 and 67 common to the respective wheel cylinders 23 is more desirable in view of cost-effectiveness than use of separate linear control valves provided in each of the wheel cylinders 23.

The differential pressure between inlet and outlet ports of the pressure-increasing linear control valve 66 corresponds to the difference between the pressure of the brake fluid within the accumulator 35 and the pressure of the brake fluid within the main flow channel 45. The differential pressure between inlet and outlet ports of the pressure-reducing linear control valve 67 corresponds to the difference between the pressure of the brake fluid within the main flow channel 45 and the pressure of the brake fluid within the reservoir 34. There is established a relationship of F1+F3=F2, where F1 stands for an electromagnetic driving force according to the electric power supplied to the linear solenoids of the pressure-increasing linear control valve 66 and the pressure-reducing linear control valve 67, F2 refers to a biasing force of the springs, and F3 denotes a differential pressure acting force according to the differential pressure between the inlet and outlet ports of the pressure-increasing linear control valve 66 and the pressure-reducing linear control valve 67. Therefore, it is possible to control the differential pressure between the inlet and outlet ports of the pressure-increasing linear control valve 66 and the pressure-reducing linear control valve 67 by continuously controlling the electric power supplied to the linear solenoids of the linear control valves 66 and 67.

In the brake control device 20, the hydraulic power source 30 and the hydraulic actuator 40 are controlled by a brake electronic control unit (ECU) 70, which serves as the control unit in the present embodiment. The brake ECU 70 is formed of a microprocessor including a CPU and is provided with a ROM for storing various programs, a RAM for temporarily storing data, input/output ports, communication ports and so forth. The brake ECU 70 is capable of making communication with a hybrid ECU (not shown) ranked higher. The brake ECU 70 controls the pump 36 of the hydraulic power source 30 and the electromagnetic control valves 51 to 54, 56 to 59, 60 and 64 to 68 of the hydraulic actuator 40 in response to control signals supplied from the hybrid ECU and detection signals fed from various sensors.

A regulator pressure sensor 71, an accumulator pressure sensor 72 and a control pressure sensor 73 are connected to the brake ECU 70. On the upstream side of the regulator cut-off valve 65, the regulator pressure sensor 71 detects the pressure of the brake fluid within the regulator flow path 62, i.e., the regulator pressure, and then feeds a signal indicative of the detected pressure value to the brake ECU 70. On the upstream side of the pressure-increasing linear control valve 66, the accumulator pressure sensor 72 detects the pressure of the brake fluid within the accumulator flow path 63, i.e., the accumulator pressure, and then feeds a signal indicative of the detected pressure value to the brake ECU 70. The control pressure sensor 73 detects the pressure of the brake fluid within the first flow path 45a of the main flow channel 45 and then feeds a signal indicative of the detected pressure value to the brake ECU 70. The detected pressure values of the respective pressure sensors 71, 72 and 73 are periodically applied to the brake ECU 70 one after another and stored in a specified storage region of the brake ECU 70.

In case the divider valve 60 is in the open state in which the first and second flow paths 45a and 45b of the main flow channel 45 communicate with each other, the output value of the control pressure sensor 73 indicates both the lower side hydraulic pressure of the pressure-increasing linear control valve 66 and the higher side hydraulic pressure of the pressure-reducing linear control valve 67. Thus the output value can be used in controlling the linear control valves 66 and 67. In case the linear control valves 66 and 67 are kept closed with the master cut-off valve 64 remaining in the open state, the output value of the control pressure sensor 73 indicates the master cylinder pressure. In case the divider valve 60 is opened to allow the first and second flow paths 45a and 45b of the main flow channel 45 to communicate with each other while the ABS keeping valves 51 to 54 are opened with the ABS pressure-reducing valves 56 to 59 remaining in the closed state, the output value of the control pressure sensor 73 indicates the working hydraulic pressure acting on the respective wheel cylinders 23, i.e., the wheel cylinder pressure.

A stroke sensor 25 provided in the brake pedal 24 is also connected to the brake ECU 70. The stroke sensor 25 detects a pedal stroke, i.e., an operation amount of the brake pedal 24, and then feeds a signal that indicates the detected brake pedal operation amount to the brake ECU 70. The output values of the stroke sensor 25 are periodically applied to the brake ECU 70 one after another and stored in a specified storage region of the brake ECU 70. In the present embodiment, the stroke sensor 25 has two contact points and is capable of outputting two measurement values to the brake ECU 70 as if two separate sensors work.

Furthermore, a stop lamp switch 80 is connected to the brake ECU 70. When the brake pedal 24 is depressed, the stop lamp switch 80 is activated to thereby turn on a stop lamp (not shown). If the brake pedal 24 is released, the stop lamp switch 80 is deactivated, thereby turning off the stop lamp. Signals indicating that the stop lamp is turned on are periodically input from the stop lamp switch 80 to the brake ECU 70 and stored in a specified storage region of the brake ECU 70.

The brake control device 20 configured as above is capable of performing regenerative braking combination control. Upon reception of a braking request, the brake control device 20 starts a braking operation. The braking request occurs when a braking force needs to be applied to a vehicle, e.g., when the brake pedal 24 is operated by a driver. Responsive to the braking request, the brake ECU 70 computes a required braking force and then deducts a regenerative braking force from the required braking force to calculate a required hydraulic braking force, which is a braking force to be generated by the brake control device 20. In this regard, a value of the regenerative braking force is supplied from the hybrid ECU to the brake control device 20. Based on the required hydraulic braking force thus calculated, the brake ECU 70 calculates a target hydraulic pressure to be applied to each wheel cylinder 23. Using a feedback control method, the brake ECU 70 decides the amount of a control current to be supplied to the pressure-increasing linear control valve 66 and the pressure-reducing linear control valve 67, so that the wheel cylinder pressure can be equal to the target hydraulic pressure.

As a result, the brake control device 20 allows the brake fluid to be supplied from the hydraulic power source 30 to the respective wheel cylinders 23 through the pressure-increasing linear control valve 66, whereby braking forces are exerted on the vehicle wheels. If necessary, the brake fluid is drained from each wheel cylinder 23 through the pressure-reducing linear control valve 67, thereby adjusting the braking force applied to the vehicle wheels. In the present embodiment, a wheel cylinder pressure control system is configured to include the hydraulic power source 30, the pressure-increasing linear control valve 66 and the pressure-reducing linear control valve 67. With the wheel cylinder pressure control system, braking force control is performed by what is called brake-by-wire. The wheel cylinder pressure control system is provided in parallel with a brake fluid supply route through which the brake fluid is supplied from the master cylinder unit 27 to the wheel cylinders 23.

During the braking process, the brake ECU 70 keeps the regulator cut-off valve 65 closed, to ensure that no brake fluid is supplied from the regulator 33 to the wheel cylinders 23. Furthermore, the brake ECU 70 brings the master cut-off valve 64 into a closed state, while allowing the simulator cut-off valve 68 to be opened. This is to ensure that, as the brake pedal 24 is operated by a driver, the brake fluid of the master cylinder 32 is not supplied to the wheel cylinders 23 but to the stroke simulator 69. During the course of regenerative braking combination control, a differential pressure corresponding to the magnitude of the regenerative braking force is developed between the upstream and downstream sides of the regulator cut-off valve 65 and the master cut-off valve 64.

In the present embodiment, the depression and release of the brake pedal 24, is determined by the control unit, namely the brake ECU 70, based on the input signals supplied from the corresponding sensors. If the brake-on determination condition is satisfied, the brake ECU 70 determines that a driver's brake operation has been initiated thereby generating a braking request. If the brake-off determination condition is satisfied, the brake ECU 70 determines that the driver's brake operation has been stopped thereby canceling the braking request. In the following description, the generation of a braking request may be referred to as a "brake-on state" and the cancellation of a braking request may be referred to as a "brake-off state" when appropriate.

To determine the braking state with improved fail-safety and increased accuracy, the brake ECU 70 determines the brake-on state and the brake-off state based on input signals supplied from a plurality of sensors. Needless to say, the brake ECU 70 can make such a determination based on the measurement value of a single sensor.

In the present embodiment, the control unit performs a first determination by which the occurrence of a braking request is determined based on a plurality of input signals, including an input signal indicative of the pedal stroke, and a second determination by which the occurrence of a braking request is determined based on a plurality of input signals, including an input signal that indicates the working hydraulic pressure. The control unit determines that a brake-on determination condition is satisfied if at least one of the first and second determinations indicates the occurrence of a braking request. In the first determination, the control unit regards a braking request as having occurred if all or more than half of input signals including the one indicative of the pedal stroke show the occurrence of a braking request. In the second determination, the control unit regards a braking request as having occurred if all or more than half of input signals including the one indicative of the working hydraulic pressure show the occurrence of a braking request.

The input signals used for the control unit to make the first and second determinations typically include, but is not limited to, e.g., those signals that are input to the control unit and that indicate the values measured by the stroke sensor, the working fluid sensor and so forth. However it is possible that the input signals may not indicate the values measured by the sensors but may be those signals changed by depression and release of the brake operation, e.g., the signals input from the stop lamp switch to the control unit. The term "sensor" or "sensors" used below for the sake of convenience is intended to include not only a so-called sensor but also a means for inputting a signal changed by the brake operation to the control unit.

As set forth above, the control unit determines it to be a brake-on state if one of the results of the first and second determinations shows the brake-on state. This enhances failsafety in detecting the brake-on state, which triggers generation of braking force in the brake-by-wire system. Combined use of the first and second determinations makes it possible to detect the brake-on state based on one determination result even if one of the sensors used in the other determination is malfunctioning or even if the output values of the sensors normally used in the other determination are temporarily in an unreliable state, i.e., in a so-called invalid state, due to the influence of noise or other causes. An additional determination may be added to the first and second determinations, in which case it is determined to be a brake-on state if one of the determination results indicates the brake-on state. As an example, it may be possible to regard a brake-on determination condition as having been satisfied if one of the three determination results indicates the occurrence of a braking request.

In each of the first and second determinations, it is concluded to be a brake-on state if all or more than half of input signals indicate the brake-on state. Each of the first and second determinations includes multiple determination systems using a plurality of sensors. Typically, the control unit performs each of the first and second determinations based on two input signals. As noted above, each of the determination systems determines that the brake-on determination condition is satisfied if all or more than half of input signals unanimously indicate the brake-on state. Therefore, it is possible to reduce the chance of erroneously determining the brake-on state, which would be caused by the variations in sensor values having nothing to do with the brake-on state. Examples of the major causes that change the sensor values regardless of the brake-on state include noises of the sensor values and variations in an environmental temperature.

Just like the brake-on determination condition described above, a plurality of determination systems having multiple systems using a plurality of sensors may be used in determining a brake-off determination condition. The control unit performs a third determination by which the cancellation of a braking request is determined based on a plurality of input signals including the one indicative of a pedal stroke and a fourth determination by which the cancellation of a braking request is determined based on a plurality of input signals including the one indicative of a working hydraulic pressure. The control unit determines that the brake-off determination condition has been satisfied if the results of the third and fourth determinations unanimously indicate the cancellation of a braking request. In the third determination, the control unit regards a braking request as having been cancelled if all or more than half of input signals, including the one that indicates a pedal stroke, show the cancellation of a braking request. In the fourth determination, the control unit regards a braking request as having been cancelled if all or more than half of input signals including the one indicative of the working hydraulic pressure show the cancellation of a braking request.

In each of the third and fourth determinations, it is determined that the brake-off determination condition is satisfied if one of the input signals indicates the brake-off state. Each of the third and fourth determinations includes multiple determination systems using a plurality of sensors. Typically, the control unit performs each of the third and fourth determinations based on two input signals.

The control unit may perform the first and third determinations based on the input signals supplied from common sensors. The combination of sensors used when performing the first determination may be different from that used in performing the third determination. Likewise, the control unit may perform the second and fourth determinations based on the input signals supplied from common sensors. Again, the combination of sensors used when performing the second determination may be different from that used in performing the fourth determination. If the first and third determinations are performed based on the input signals supplied from common sensors and if the second and fourth determinations are performed based on the input signals supplied from common sensors, the brake-off determination condition would simply be the opposite of the brake-on determination condition.

More specifically, the brake-on determination condition in the present embodiment is set using a pedal stroke, a regulator pressure and a wheel cylinder pressure. In the first determination, the brake ECU 70 determines whether it is a brake-on state using, e.g., two measurement values supplied from the stroke sensor 25. The brake ECU 70 determines that the brake-on condition is satisfied in the first determination if the two measurement values supplied from the stroke sensor 25 are all greater than a predetermined threshold value. In the second determination, the brake ECU 70 determines whether it is a brake-on state using, e.g., measurement values of the regulator pressure sensor 71 and the control pressure sensor 73. The brake ECU 70 determines that the brake-on condition is satisfied in the second determination if the measurement values of the regulator pressure sensor 71 and the control pressure sensor 73 are all greater than a predetermined threshold value. If at least one of the results of the first and second determinations shows a brake-on state, the brake ECU 70 determines it to be a brake-on state and then starts braking force control by means of brake-by-wire.

For the sake of easier understanding, various conditions for use in the brake-on determination are defined as follows.

Condition A1 means that the input signal supplied from one system of the stroke sensor 25 indicates a brake-on state.

Condition A2 means that the input signal supplied from the other system of the stroke sensor 25 indicates a brake-on state.

Condition A3 means that the input signal supplied from the regulator pressure sensor 71 indicates a brake-on state.

Condition A4 means that the input signal supplied from the control pressure sensor 73 indicates a brake-on state.

Using the above-noted definition, the brake-on determination condition in the present embodiment can be represented by an expression (A1 AND A2) OR (A3 AND A4). In other words, the brake ECU 70 determines it to be a brake-on state if the brake-on state is determined based on a stroke measurement value or a working hydraulic pressure. In this regard, the term "OR" is intended to include not only satisfaction of one of the expressions "A1 AND A2" and "A3 AND A4" but also satisfaction of both of the expressions "A1 AND A2" and "A3 AND A4".

Just like the brake-on determination condition, the brake-off determination condition is set using a pedal stroke, a regulator pressure and a wheel cylinder pressure. In the third determination, the brake ECU 70 determines whether it is a brake-off state using, e.g., two measurement values supplied from the stroke sensor 25. The brake ECU 70 determines that the third determination indicates a brake-off state if at least one of the two measurement values supplied from the stroke sensor 25 is smaller than a predetermined threshold value. In the present embodiment, the threshold values of a pedal stroke used in the first and third determinations are set equal to each other.

In the fourth determination, the brake ECU 70 determines whether it is a brake-off state using, e.g., measurement values of the regulator pressure sensor 71 and the control pressure sensor 73. The brake ECU 70 determines that the fourth determination indicates a brake-off state if at least one of the measurement values of the regulator pressure sensor 71 and the control pressure sensor 73 is smaller than a predetermined threshold value. In the present embodiment, the threshold values of a hydraulic pressure used in the second and fourth determinations are set equal to each other. If the results of the third and fourth determinations both indicate a brake-off state, the brake ECU 70 determines it to be a brake-off state and then terminates braking control.

For the sake of easier understanding, various conditions for use in the brake-off determination are defined as follows.

Condition B1 means that the input signal supplied from one system of the stroke sensor 25 indicates a brake-off state.

Condition B2 means that the input signal supplied from the other system of the stroke sensor 25 indicates a brake-off state.

Condition B3 means that the input signal supplied from the regulator pressure sensor 71 indicates a brake-off state.

Condition B4 means that the input signal supplied from the control pressure sensor 73 indicates a brake-off state.

Using the above-noted definition, the brake-off determination condition in the present embodiment may be represented by an expression (B1 OR B2) AND (B3 OR B4). Noting that conditions B1 to B4 are respectively the opposites of conditions A1 to A4, it will be understood that the brake-off determination condition in the present embodiment constitutes the opposite of the brake-on determination condition. In other words, the brake-off determination condition in the present embodiment is satisfied when the brake-on determination condition is not satisfied.

In the present embodiment, a determination system for determining the occurrence and cancellation of a braking request is made using the control pressure sensor 73 for measuring a wheel cylinder pressure. This makes it possible to reduce the number of sensors attached to the brake control device 20 when a plurality of determination systems is constructed by multiple systems with a view to improve fail-safety as mentioned earlier. More specifically, it is possible to eliminate the hydraulic pressure sensor, which is attached to the master cylinder, with the regulator pressure sensor 71 to directly measure a master cylinder pressure. This simplifies the wiring and to reduces the size of the brake control system, which is desirable from the standpoint of cost-effectiveness.

Because the master cylinder unit 27 employs a hydraulically boosted master cylinder in the present embodiment, it is relatively easy to increase the wheel cylinder pressure when the brake is operated. Therefore, use of the wheel cylinder pressure in setting the brake-on determination condition or the brake-off determination condition makes it possible to determine the brake-on state or the brake-off state with increased accuracy.

The threshold values used to determine the brake-on determination condition and the brake-off determination condition with respect to the respective sensors may differ from each other. Although the threshold values of the hydraulic pressure used in the second and fourth determinations are set equal to each other in the above-noted embodiment, different the threshold values of the hydraulic pressure may be set to different values. The threshold value of a hydraulic pressure used in the fourth determination may be set greater than that used in the second determination. This helps to reduce delayed satisfaction of the brake-off determination condition even when a delay occurs in the hydraulic pressure response during a brake-off process.

The arrangement of the regulator pressure sensor 71 and the control pressure sensor 73 employed in the present embodiment is desirable in that it helps to minimize the number of hydraulic pressure sensors to be attached to the brake control device 20.

As set forth earlier, the brake control device 20 includes a front system that connects the master cylinder unit 27 with the front wheel cylinders 23FL and 23FR, a rear system that connects the master cylinder unit 27 with the rear wheel cylinders 23RL and 23RR, and the main flow channel 45 for interconnecting the front and rear systems, the divider valve 60 being provided in the middle of the main flow channel 45. Cut-off valves that control the flow of working fluid between the master cylinder unit 27 and the respective wheel cylinders 23, more particularly the master cut-off valve 64 and the regulator cut-off valve 65, are provided in the front and rear systems. Furthermore, a wheel cylinder pressure control system that commonly controls the wheel cylinder pressures when the divider valve 60 remains opened is provided in parallel with the front and rear systems.

On the basis of such a general configuration, the brake control device 20 is provided with a wheel cylinder pressure sensor, e.g., the control pressure sensor 73, arranged on the wheel cylinder side of the cut-off valve, which in turn is provided in the front system. The brake control device 20 may be further provided with a hydraulic power source pressure sensor, e.g., the regulator pressure sensor 71, arranged on the master cylinder unit side of the cut-off valve which in turn is provided in the rear system. The brake control device 20 of the present embodiment includes only three hydraulic pressure sensors, i.e., the regulator pressure sensor 71, the accumulator pressure sensor 72 and the control pressure sensor 73.

The wheel cylinder pressure sensor arranged in the front system measures the wheel cylinder pressure commonly controlled when the divider valve 60 is opened. Even when the divider valve 60 is closed, thereby disconnecting the front system and the rear system, the wheel cylinder pressure sensor detects the front wheel cylinder pressure, which usually plays a greater part in braking.

In addition, the hydraulic power source pressure sensor arranged in the rear system measures the hydraulic pressure in the master cylinder unit 27, i.e., the master cylinder pressure and the regulator pressure. If the divider valve 60 is closed to disconnect the front system and the rear system, the hydraulic power source pressure sensor is able to detect the hydraulic pressure in the rear system.

Such arrangement of the hydraulic pressure sensors makes it possible to build a brake control system with a minimized number of hydraulic pressure sensors. This helps to simplify the wiring and to reduce the system size in the brake control system, thereby saving costs.

Next, a first modified example of the present embodiment will be described. The modified example is directed to the second and fourth determinations described above that make use of the working hydraulic pressure. In this modified example, the control unit utilizes, in combination, the input signal that indicate the wheel cylinder pressure and the input signal supplied from the stop lamp switch 80. In the brake-on determination, the control unit selectively uses the input signal indicative of the wheel cylinder pressure and the input signal supplied from the stop lamp switch 80.

The first modified example is advantageously applicable to a brake system that does not have a booster mechanism or a brake system having a relatively large brake caliper, i.e., a relatively great wheel cylinder volume. In these brake systems, it is relatively difficult to increase the wheel cylinder pressure by a driver's brake operation. In contrast, the master cylinder pressure and the regulator pressure are relatively easily increased because the master cut-off valve 64 and the regulator cut-off valve 65 serve as orifices.

In this modified example, the brake ECU 70 determines that the second determination indicates a brake-on state if the input signal supplied from at least one of the control pressure sensor 73 and the stop lamp switch 80 indicates a brake-on state and if the input signal supplied from the regulator pressure sensor 71 shows a brake-on state. Furthermore, the brake ECU 70 determines that the fourth determination indicates a brake-off state either if the input signals supplied from both the control pressure sensor 73 and the stop lamp switch 80 indicate a brake-off state or if the input signal supplied from the regulator pressure sensor 71 shows a brake-off state. Indication of the brake-on state by the input signal supplied from the stop lamp switch 80 means a state that the stop lamp is turned on. Indication of the brake-off state by the input signal supplied from the stop lamp switch 80 means a state that the stop lamp is turned off.

For the sake of easier understanding, various conditions for use in the brake-on determination are further defined as follows.

Condition A5 means that the input signal supplied from the stop lamp switch 80 indicates a brake-on state.

Condition B5 means that the input signal supplied from the stop lamp switch 80 indicates a brake-off state.

Using the above-noted definition, the brake-on determination condition in this modified example may be represented by an expression (A1 AND A2) OR (A3 AND (A4 OR A5)). The brake-off determination condition in this modified example may be represented by an expression (B1 OR B2) AND (B3 OR (B4 AND B5)). Noting that condition B5 is the negative of condition A5, it will be understood that the brake-off determination condition in this modified example constitutes the opposite of the brake-on determination condition.

In the first modified example, an input signal that exhibits a higher responsiveness to the operation of the brake pedal than the wheel cylinder pressure is used in combination with the input signal that indicates the wheel cylinder pressure. This makes it possible to reduce the delay in making a braking determination even when the wheel cylinder pressure response lags the brake operation. In particular, the signal supplied from the stop lamp switch 80 is effective in reducing the delay in making a determination because it usually exhibits higher responsiveness to the operation of the brake pedal than the wheel cylinder pressure.

Next, a second modified example of the present embodiment will be described. In this modified example, the control unit uses a brake-off determination condition that is different from the negative of the brake-on determination condition. Accordingly, the control unit uses different sensor combinations to determine whether it is a brake-on state of a brake-off state. As an example, the control unit uses the wheel cylinder pressure in determining whether the brake-on determination condition is satisfied but does not use the wheel cylinder pressure in determining whether the brake-off determination condition is satisfied.

In a brake-by-wire type brake system, it is sometimes the case that, even if a driver releases the brake pedal 24, the wheel cylinder pressure does not decrease immediately. In the present embodiment, it is the case that the pressure-reducing linear control valve 67 suffers from a delay in making a pressure-reducing response. It is also the case that the pressure-reducing response of the pressure-reducing linear control valve 67 may be intentionally delayed in order to reduce the operating noise caused by self-excited vibration or the like in the pressure-reducing linear control valve 67. In these cases, there is a possibility that the reduction of the wheel cylinder pressure will lag the release of the brake pedal, thereby delaying the determination that brake-off determination, which makes use of the wheel cylinder pressure. In particular, it is likely that the regulator pressure sensor 71 may malfunction, thus delaying the brake-off determination when the detection of reduction of the wheel cylinder pressure by the control pressure sensor 73 is essential.

The second modified example is similar to the first modified example. Although the brake-on determination condition is the same in both the first and second modified embodiments, the brake-off determination condition in the first and second modified embodiments are different. In particular, the fourth determination of the brake-off determination condition of the second modified embodiment uses the input signal supplied from the stop lamp switch 80 instead of the wheel cylinder pressure. More specifically, the brake ECU 70 determines that the forth determination indicates a brake-off state if either the input signal supplied from either the stop lamp switch 80 or the regulator pressure sensor 71 indicates a brake-off state.

Using the above-noted definition for the sake of easier understanding, the brake-on determination condition in the second modified example may be represented by an expression (A1 AND A2) or (A3 AND (A4 OR A5)). The brake-off determination condition in the second modified example may be represented by an expression (B1 OR B2) and (B3 OR B5). It will be understood that the brake-off determination condition is set differently than the opposite of the brake-on determination condition.

As set forth above, in the second modified example, the brake-off state is determined using the input signal that exhibits greater responsiveness to the release of the brake pedal than the wheel cylinder pressure, e.g., the input signal supplied from the stop lamp switch 80. Use of the input signal changed immediately upon the release of the brake pedal instead of the wheel cylinder pressure makes it possible to rapidly and reliably determine the brake-off state. Even when the regulator pressure sensor 71 malfunctions, it is possible to rapidly determine the brake-off state as long as the stop lamp switch 80 continues to function normally. This makes it possible to perform a braking determination with improved fail-safety. Moreover, it is possible to increase the design flexibility in relation to the intentional delay of a pressure-reducing response of the pressure-reducing linear control valve 67. In the second modified example, though the brake-off state is determined in the fourth determination by using the input signals supplied from the stop lamp switch 80 and the regulator pressure sensor 71, it is possible to determine the brake-off state in the forth determination by using only the input signal supplied from the stop lamp switch 80.

With the second modified example, the brake-off determination condition is not merely set as the opposite of the brake-on determination condition but is set differently than the opposite of the brake-on determination condition. Therefore, the determination condition can be set in due consideration of the target measurement quantities in the brake-on state and the brake-off state, e.g., the difference in variations of the working hydraulic pressure. This makes it possible to reliably determine the occurrence or absence of a driver's braking request.

In this connection, the stroke sensor 25 may be used in place of the stop lamp switch 80. However, if the determination systems are dually constructed by the stroke-based determination system and the hydraulic pressure-based determination system as in the present embodiment, it will be desirable to use a sensor other than the stroke sensor 25 already included in the determination systems.

While the invention has been shown and described with respect to the example embodiments, it will be understood by those skilled in the art that various changes and modifications may be mode without departing from the scope of the invention.

What is claimed is:

1. A brake control device, comprising:
a control unit that determines a braking request by a driver occurred when a brake-on determination condition is satisfied and determines a braking cancellation occurred when a brake-off determination condition is satisfied,
wherein the control unit determines whether the brake-on determination condition is satisfied by performing a first determination that determines whether the braking request occurred based on a first plurality of input signals, and by performing a second determination that determines whether the braking request occurred based on a second plurality of input signals, and
wherein the control unit determines whether the brake-off determination condition is satisfied by performing a third determination that determines whether the braking cancellation occurred based on a third plurality of input signals, and by performing a fourth determination that determines whether the braking cancellation has occurred based on a fourth plurality of input signals.

2. The brake control device according to claim 1, wherein the brake-off determination condition is a condition that is different from the opposite of the brake-on determination condition.

3. The brake control device according to claim 2, wherein the control unit uses a wheel cylinder pressure to determine whether the brake-on determination condition is satisfied but does not use the wheel cylinder pressure to determine whether the brake-off determination condition is satisfied.

4. The brake control device according to claim 3, wherein the control unit determines a brake-off state based on an input signal that exhibits higher responsiveness to the release of a driver's brake operation than the wheel cylinder pressure.

5. The brake control device according to claim 4, wherein the control unit determines the brake-off state based on the input signal supplied from a stop lamp switch.

6. The brake control device according to claim 1, wherein the brake-off determination condition is a condition that is the opposite of the brake-on determination condition.

7. The brake control device according to claim 1, wherein the first plurality of input signals includes a pedal stroke input signal indicative of a pedal stroke, the second plurality of input signals includes a working hydraulic pressure input signal that indicates a working hydraulic pressure, the third plurality of input signals includes the pedal stroke input signal, and the fourth plurality of input signals includes the working hydraulic pressure input signal.

8. The brake control device according to claim 1, wherein the control unit determines that the brake-on determination condition is satisfied if at least one of the first and second determinations indicates the occurrence of a braking request, and determines that the brake-off determination condition has been satisfied if the third and fourth determinations both indicate the cancellation of a braking request.

9. The brake control device according to claim 1, wherein, in the first determination, the control unit regards the braking request as having occurred if all or more than half of the first plurality of input signals show the occurrence of the braking request,
in the second determination, the control unit regards the braking request as having occurred if all or more than half of the second plurality of input signals show the occurrence of the braking request,
in the third determination, the control unit regards the braking cancellation as having been occurred if all or more than half of the third plurality of input signals show the occurrence of the braking cancellation, and in the fourth determination, the control unit regards the braking cancellation as having occurred if all or more than half of the fourth plurality of input signals show the occurrence of the cancellation of a braking request.

10. The brake control device according to claim 1, wherein:
two measurement values are supplied from a stroke sensor to the control unit, and the control unit determines that the brake-on determination condition is satisfied in the first determination if the two measurement values supplied from the stroke sensor are both greater than a first predetermined threshold value,
the control unit determines that the brake-on determination condition is satisfied in the second determination if measurement values obtained from a regulator pressure sensor and a control pressure sensor are both greater than a second predetermined threshold value,
the control unit determines that the brake-off determination condition is satisfied in the third determination if at least one of the two measurement values supplied from the stroke sensor is smaller than a third predetermined threshold value, and
the control unit determines that the brake-off determination condition is satisfied in the fourth determination if at least one of the measurement values of the regulator pressure sensor and the control pressure sensor is smaller than a fourth predetermined threshold value.

11. The brake control device according to claim 1, wherein the control unit determines that the second determination indicates the occurrence of the braking request if an input signal supplied from at least one of a control pressure sensor and a stop lamp switch indicates a brake-on state and if an input signal supplied from a regulator pressure sensor shows a brake-on state, and
the control unit determines that the fourth determination indicates the occurrence of braking cancellation either if the input signals supplied from both the control pressure sensor and the stop lamp switch indicate a brake-off state or if the input signal supplied from the regulator pressure sensor shows a brake-off state.

12. The brake control device according to claim 1, wherein if the control unit determines a braking request occurred, the control unit computes a required braking force and then deducts a regenerative braking force from the required braking force to calculate a required hydraulic braking force, wherein the regenerative braking force is received by the control unit from a hybrid ECU.

13. A brake control method, comprising:
determining a braking request occurred when a brake-on determination condition is satisfied, said determining a driver's braking request occurred including
performing a first determination that determines whether the braking request occurred based on a first plurality of input signals, and
performing a second determination that determines whether the braking request occurred based on a second plurality of input signals; And
determining a braking cancellation occurred when a brake-off determination condition is satisfied, said determining a braking cancellation occurred including
performing a third determination that determines whether the braking cancellation occurred based on a third plurality of input signals, and
performing a fourth determination that determines whether the braking cancellation has occurred based on a fourth plurality of input signals.

14. The brake control method according to claim 13, wherein the brake-off determination condition is a condition that is different from the opposite of the brake-on determination condition.

15. The brake control method according to claim 14, wherein a wheel cylinder pressure is used to determine whether the brake-on determination condition is satisfied, but is not used to determine whether the brake-off determination condition is satisfied.

16. The brake control method according to claim 15, wherein a brake-off state is determined based on an input signal that exhibits higher responsiveness to the release of a driver's brake operation than the wheel cylinder pressure.

17. The brake control method according to claim 16, wherein the brake-off state is determined based on the input signal supplied from a stop lamp switch.

18. The brake control method according to claim 13, wherein the brake-off determination condition is a condition that is the opposite of the brake-on determination condition.

19. A brake control device that determines an operational state of a brake pedal, said brake control device comprising:
a control unit that determines whether a brake pedal is in a depressed state or a released state based on a plurality of input signals from a plurality of sensors, said plurality of input signals including a pedal stroke signal from a pedal stroke sensor and a pressure signal from a pressure sensor,
wherein said control unit recognizes said depressed state when a brake-on condition is satisfied, and said control unit recognizes said released state when a brake-off condition is satisfied,
wherein said control unit determines whether said brake-on condition is satisfied based on a first determination performed by said control unit and a second determination performed by said control unit, said first determination including evaluating whether a first plurality of signals that includes said pedal stroke signal meets a first brake-on criterion, said second determination including evaluating whether a second plurality of signals that includes said first pressure signal meets a second brake-on criterion, and wherein said control unit determines whether said brake-off condition is satisfied based on a third determination performed by said control unit and a fourth determination performed by said control unit, said third determination including evaluating whether a third plurality of signals meets a first brake-off criterion, said fourth determination including evaluating whether a fourth plurality of signals meets a second brake-off criterion.

20. The brake control device according to claim 19, wherein said control unit determines that said brake-on condition is satisfied when more than half of said first plurality of signals meet said first brake-on criterion or more than half of said second plurality of signals meet said second brake-on criterion.

21. The brake control device according to claim 19, wherein said first brake-off criterion is not an opposite state of said first brake-on criterion, and wherein said second brake-off criterion is not an opposite state of said second brake-on criterion.

22. The brake control device according to claim 19, wherein said fourth plurality of signals includes an input signal supplied from a stop lamp switch.

* * * * *